UNITED STATES PATENT OFFICE.

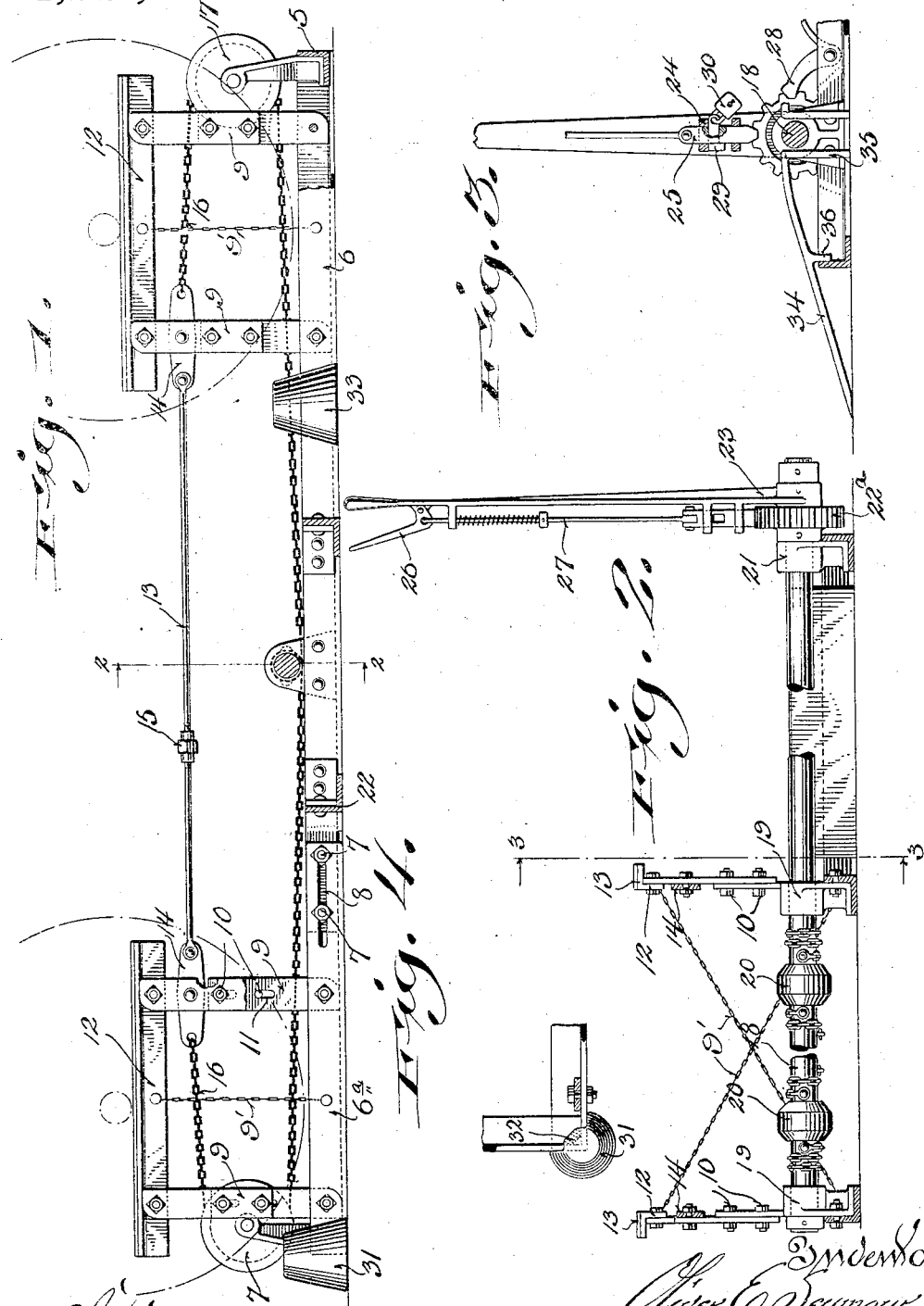

OLIVER E. SEYMOUR, OF MILWAUKEE, WISCONSIN, ASSIGNOR OF ONE-HALF TO WILLIAM J. THOMAS, OF MILWAUKEE, WISCONSIN.

AUTOMOBILE-LIFTING APPARATUS.

1,240,496. Specification of Letters Patent. Patented Sept. 18, 1917.

Application filed October 27, 1916. Serial No. 127,999.

*To all whom it may concern:*

Be it known that I, OLIVER E. SEYMOUR, a citizen of the United States, and resident of Milwaukee, in the county of Milwaukee and State of Wisconsin, have invented certain new and useful Improvements in Automobile-Lifting Apparatus, and do hereby declare that the following is a full, clear, and exact description thereof.

The present invention relates to new and useful improvements in apparatus for lifting vehicles and is more particularly directed to the provision of an apparatus for lifting automobiles, whereby their wheels may be suspended in the air to permit desired manipulation thereof, and also to relieve the tires from the weight of the automobile when not in use, to thus materially lengthen the life of the tires.

It is in general the object of the present invention to simplify and otherwise improve the efficiency of an apparatus of this character, and it is more particularly an object to provide a lifting apparatus adapted for permanent disposition on the ground or floor of a garage and over which the automobile may be readily driven for manipulation by the said apparatus.

It is further an object to provide a lifting apparatus of the present nature which is adjustable to adapt it for use in connection with automobiles of differing sizes and types.

With the above and other objects and advantages in view the invention resides more particularly in the novel combination arrangement and formation of parts herein described and pointed out in the appended claims.

In the drawings:

Figure 1 is a side elevational view of an automobile lifting apparatus constructed in accordance with the present invention, and having its automobile engaging parts in raised position, the means for rotating the operating shaft being broken away.

Fig. 2 is a transverse sectional view through the improved apparatus on the line 2—2 of Fig. 1.

Fig. 3 is a sectional view on the line 3—3 of Fig. 2 showing the means for rotating the operating shaft of the apparatus.

Fig. 4 is a detail elevational view of one corner of a body frame of the apparatus showing a bumper associated therewith.

Referring now more particularly to the accompanying drawings, the body frame of the device comprises side sills and end sills preferably formed of angle iron and adapted to either rest directly upon the ground or floor of a garage or to be embedded therein, the side sills each including sections 6 and 6ᵃ adjustably connected by bolts 7 passed through one section and through a longitudinal slot 8 in the other section, whereby the length of the entire apparatus may be adjusted to provide for use in connection with cars of different lengths.

Pivotally secured to spaced portions of the outer end of each longitudinal sill section is a pair of upstanding links 9, each of these links comprising lapped sections adjustably connected by bolts 10 passed through one section and through longitudinal slots 11 in the other section whereby the length of the links may be adjusted to provide for automobiles having axles at different heights. The upper ends of each pair of links are pivotally connected by a bar 12 preferably carrying an upper facing or pad of suitable cushioning material 13. Each pair of links and the corresponding side sill portion and bar 12 thus form a parallelogram. The bars 12 at each end of the body frame are adapted to engage under one axle of a vehicle, whereby upon collapsing or extending the palallelograms including said bars, the automobile may be raised or lowered.

The parallelograms at each side of the apparatus are connected by a link 13 pivotally secured to transverse bars 14 carried by adjacent links 9, the link 13 including an intermediate turn-buckle portion 15 whereby it may be varied in length to correspond to variations of the length of the apparatus afforded by the bolts 7 and slots 8 of the side sill portions of the body frame. For actuating the parallelograms to raise and lower the top bars 12 thereof, a chain 16 is secured to each carried bar 14 and is extended outwardly to the end of the body frame and trained about a pulley 17 at the adjacent corner thereof, and then extended inwardly and wound about a transverse drum shaft 18 journaled in upstanding bearings 19 of the main side sill sections 6, there being four of these chains and the chains of the parallelograms at each side of the body frame being separated by spacing enlargements 20 on the drum shaft.

Referring to Fig. 1, by rotating the drum shaft in a counter-clockwise direction the parallelograms will be actuated from collapsed position to raise the axle carrying bar 12, and by rotating the shaft in clock-wise direction the parallelograms will again be collapsed to lower the bars 12, it being noted that when the bars 12 are in their uppermost position the links 9 are vertical to take the entire load strain of the automobile.

For actuating the drum shaft 18, one end thereof is extended outwardly of one side of the body frame and journaled in a bearing 21 carried by the outer portion of a U shaped beam 22 which has the free ends of its legs bolted to the adjacent side sill sections 6. Fixed on the shaft outwardly of the bearing 21 is a ratchet wheel 22ª and journaled on the shaft is a handle lever 23 having outstanding bracket lugs 24 at its inner portion in which is slidable a pawl 25 controlled by a conventional handle grip 26 and spring urged link 27. A second pawl 28 is pivoted to the beam 22 and engages the ratchet wheel to prevent retrograde movement thereof, in the lifting actuation of the axle engaging bars 12. Thus upon rocking the lever 23 and selectively engaging its pawl 25 with the wheel 22ª the parallelograms may be extended to raise the bars 12 and an automobile carried thereby. To lock the apparatus in this raised position and thus prevent unauthorized removal of the automobile therefrom, a pin 29 may be passed through the pawl 25 below one of the bearing lugs 24 for attachment of a lock 30 to its extended end.

In the arrangement shown in the drawings the bars 12 are adapted to engage the axles of an automobile inwardly of its wheels, and to prevent abutting engagement of the wheel with the body frame of the apparatus in propelling the automobile to operative position over the apparatus, buffers 31 are disposed at the corners of the frame and are held in place by the depending lip portions 32 engaging within said corners, the said buffers being cut away to embrace the corners. Buffers 33 are also carried by the side sills 6 of the body frame immediately inwardly of the links 9. For guiding the forward corner wheel of the automobile over the extended portion of the drum shaft 18 and the U shaped beam 22, inclined track plates 34 are provided having their outer ends adapted to rest on the ground or floor of a garage and having their inner ends downwardly directed to form supporting legs 35. Lugs 36 depend from intermediate portions of the plate and are adapted to abut the inner faces of the legs of the beam 22 to prevent displacement of the plates, in conjunction with the abutment of the supporting legs 35 with the shaft 18.

With the body frame, and consequently the shaft and beam 22 embedded in the floor or ground of a garage, these plates can obviously be dispensed with. Also it is noted that in some instances it may be desirable to engage the lifting bars 12 with the axles outwardly of the wheel and in this instance the body frame would be embedded in the ground or floor and suitable means would be provided for guiding the wheels over the ends of the frame, and over the shaft 18 between the side sills of the frame.

While I have shown and described one preferred embodiment of my invention it is obvious that to meet differing conditions of use various modifications and changes of structure may be resorted to without departing in any manner from the spirit of the invention as interpreted by the scope of the appended claims.

As shown in Fig. 2 of the drawings, the links are cross connected by brace chains or cables 9', whereby rigidity is added to the structure transversely to resist strain of the load upon the hinged joints.

What is claimed:

1. A vehicle lifting mechanism comprising a body frame, lifting members having their inner ends pivoted adjacent the corners of the body frame, means connecting the lifting members at each side of the frame whereby they move in unison, pulleys at the ends of the body frame, and a transversely journaled drum shaft and flexible connection secured to the lifting members and trained about said pulleys and wound on said drum shaft.

2. A vehicle lifting mechanism comprising a main frame, lifting members pivoted adjacent the corners of the main frame, a U shaped beam having the ends of its legs secured to one side of the main frame, bearings on the main frame and said U shaped beam, a shaft journaled in said bearings, flexible members wound on said shaft and connected with the lifting members, inclined track plates, depending legs at the inner ends of said plates adapted to abut the shaft and depending lugs at the intermediate portions of said plates adapted to abut the legs of said U shaped beam.

In testimony that I claim the foregoing I have hereunto set my hand at Milwaukee, in the county of Milwaukee and State of Wisconsin, in the presence of two witnesses.

OLIVER E. SEYMOUR.

Witnesses:
GEO. W. YOUNG,
M. E. DOWNEY.